Figure 3:
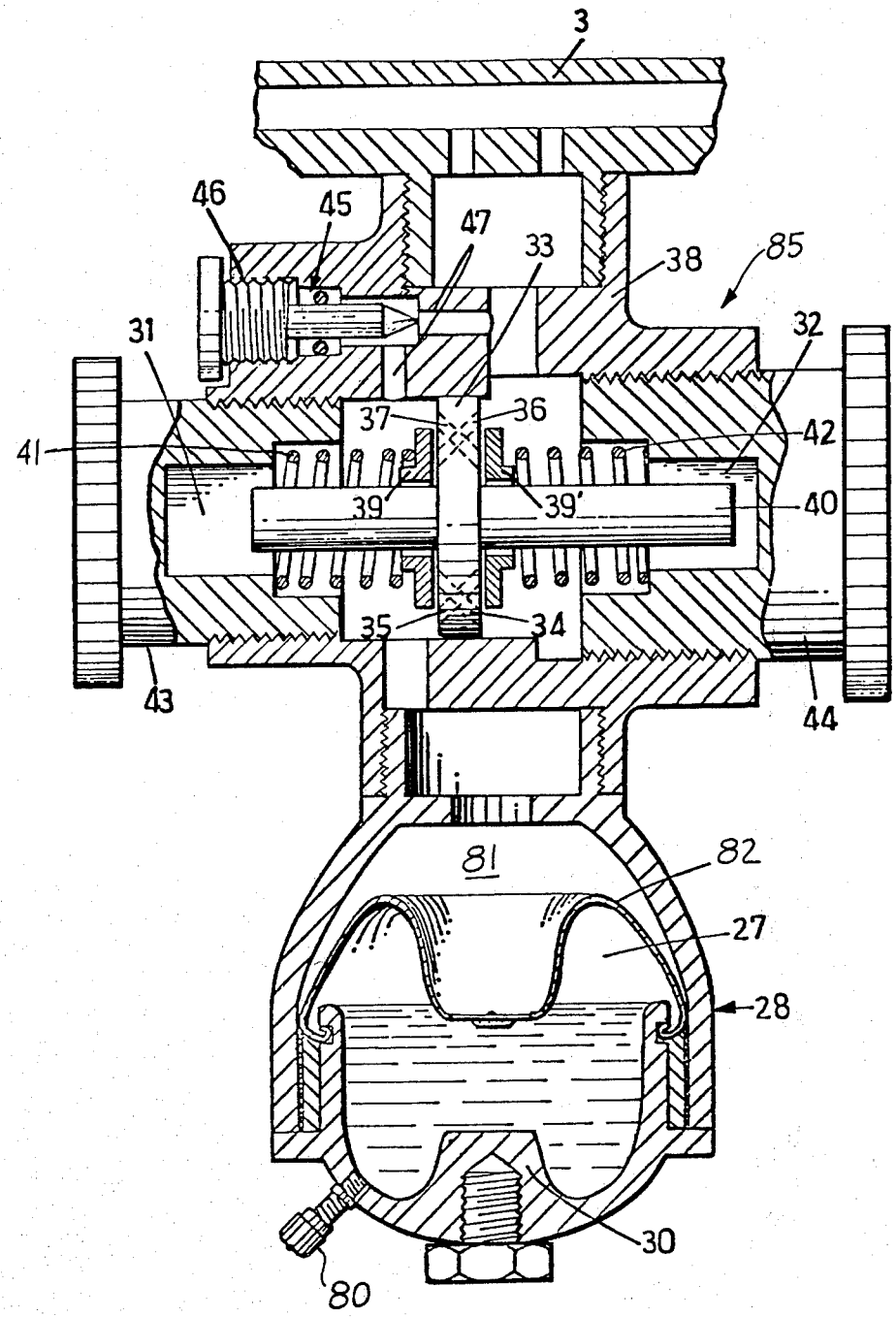

United States Patent [19]

Tilkens

[11] 3,945,626

[45] Mar. 23, 1976

[54] VEHICULAR SPRINGING MEANS

[75] Inventor: Lucien Tilkens, Aalst-Brustem, Belgium

[73] Assignee: Yamaha Hatsudoki Kabushiki Kaisha, Iwata, Japan

[22] Filed: Feb. 6, 1975

[21] Appl. No.: 547,552

[30] Foreign Application Priority Data

Feb. 8, 1974    Belgium .............................. 810776

[52] U.S. Cl. ........... 267/64 R; 280/124 F; 188/298; 188/274
[51] Int. Cl.² ......................................... F16F 5/00
[58] Field of Search ........ 267/64 R, 64 A, 113, 118, 267/120; 188/298, 274; 280/124 F

[56] References Cited

UNITED STATES PATENTS

| 3,567,244 | 3/1971 | Hoffmann et al. ..................... 267/65 |
| 3,795,291 | 3/1974 | Naito et al. .......................... 188/274 |

*Primary Examiner*—James B. Marbert
*Attorney, Agent, or Firm*—Donald D. Mon

[57] ABSTRACT

A telescoping springing means for a vehicle, for example a motorcycle or automobile. The springing means comprises a first and a second telescopic member which are coaxial and are intended for attachment to respective relatively movable parts of the vehicle. One of the telescopic members forms an internal fluid-tight chamber which includes a plunger recess. A plunger is attached to the other of the telescopic members, projects into the chamber, and makes a fluid seal therewith. The plunger is adapted to enter the plunger recess to form a first decelerator for deceleration of contraction of the springing means. A pneumatic-hydraulic accumulator has a closed pneumatic section adapted to be filled with a gas under pressure and a hydraulic section filled with liquid. A movable wall separates the sections so as to equalize their pressures. A conduit connects the hydraulic section to the chamber.

A second decelerator is provided for deceleration of extension of the springing means. The second decelerator comprises a valve seat member attached to said one of the telescopic members, and a valving member attached to the plunger inside the chamber. The valving member is adapted to enter a decelerator recess in the valve seat member to cause expulsion of liquid therefrom, the restriction of this flow decelerating the extension motion. The decelerators tend to decelerate the respective motions, at least near the limit thereof.

19 Claims, 3 Drawing Figures

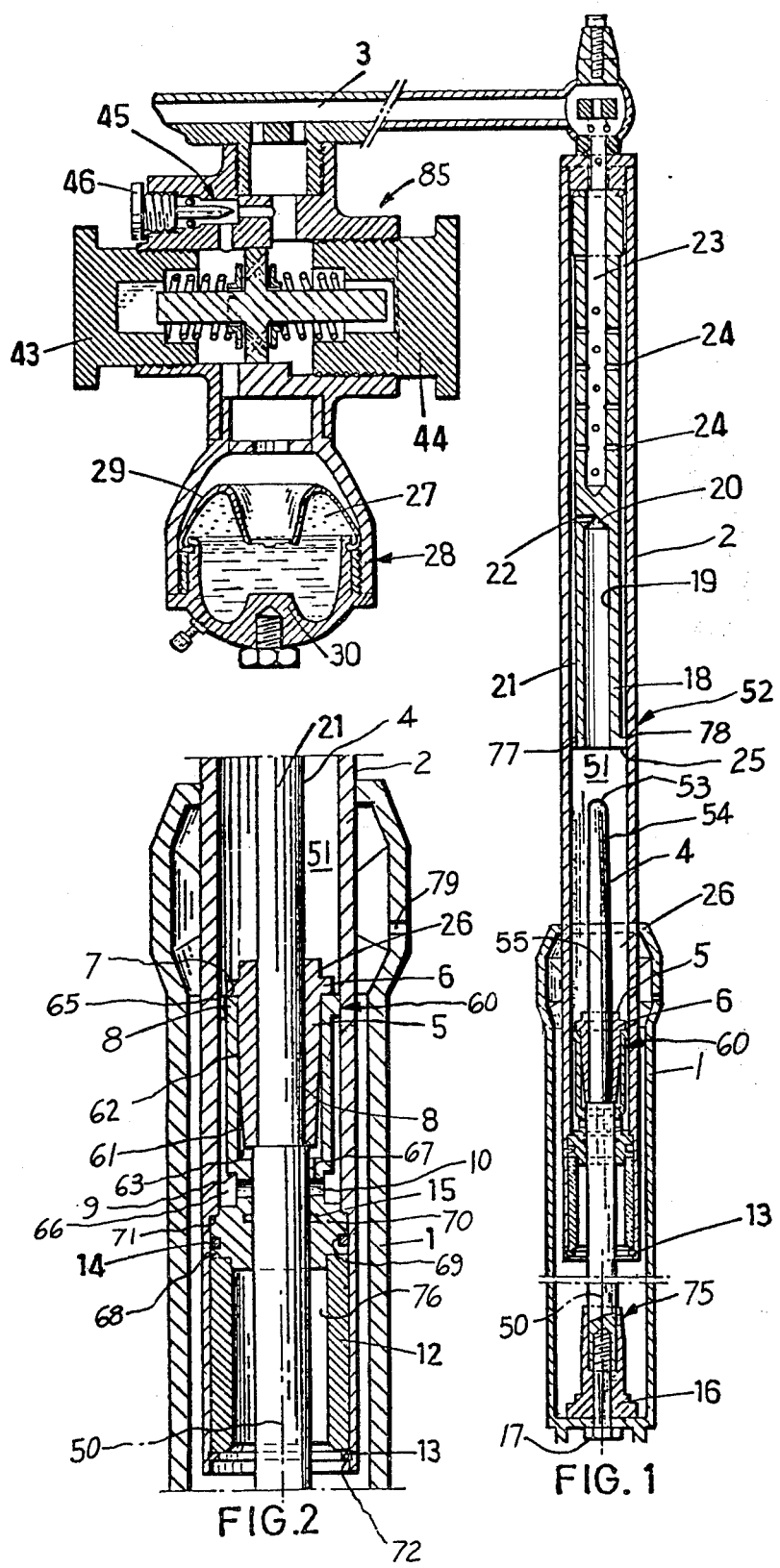

VEHICULAR SPRINGING MEANS

This invention relates to springing means for vehicles, for example motorcycles or automobiles.

An object of the invention is to provide springing means which meet the stringent requirements for road-holding and stability in cross-country and motocross operations, and in high-speed operations generally.

A springing means according to this invention comprises a first and a second telescopic member, each of which has an axis of relative motion, the members being coaxial and intended for attachment to respective movable parts of a vehicle, such as the chassis and the axle. The telescopic members move coaxially relative to one another when the said parts move relative to one another. One of the telescopic members forms an internal fluid-tight chamber including a plunger recess. A plunger is attached to the other telescopic member and projects into the chamber and makes a sliding, fluid-sealing fit therewith. The plunger and plunger recess are coaxial and parallel to the said axis. Together they form a first decelerator for deceleration of axial contraction of the springing means as a consequence of the entry of the plunger into the plunger recess.

A second decelerator is provided for deceleration of axial extension of the springing means. The second decelerator comprises a valve seat member attached to said one of the telescopic members and a valving member attached to the plunger inside the chamber. The valve seat member forms a valve seat and a decelerator recess which opens into the chamber. The valving member is adapted to enter the decelerator recess, at least near the end limit of the extension motion. The entry of the valving member into the recess causes an expulsion of liquid therefrom, the restriction of this flow decelerating the extension motion.

A pneumatic-hydraulic accumulator has a closed pneumatic section adapted to be filled with a gas under pressure. A hydraulic section is filled with a liquid, and a movable wall separates the sections and tends to equalize their pressures. A conduit connects the hydraulic section to the chamber. Pressure in the conduit tends to extend the springing means and resists its contraction, and the decelerators tend to decelerate the respective motions, at least near the limit thereof.

According to a preferred but optional feature of the invention, rate control valve means is connected in the conduit between the chamber and the hydraulic section.

According to another preferred but optional feature of the invention, the rate control valve means further includes a bi-directional relief valve and a parallel flow connection with said adjustable restrictor valve for opening an additional flow path when the pressure differential across the relief valve exceeds a predetermined value.

According to yet another preferred but optional feature of the invention, a restrictive bypass channel is formed between the conduit and the chamber in parallel flow connection with the plunger recess.

The above and other features of this invention will be fully understood from the following detailed description and the accompanying drawings, in which:

FIG. 1 is an axial cross-section showing the presently preferred embodiment of the invention; and FIGS. 2 and 3 are cross-sections, principally in axial cross-section, comprising enlargements of parts of FIG. 1.

FIG. 1 shows the presently preferred embodiment of springing means according to the invention. In FIG. 1 there is shown only one pair of telescopic members, i.e., telescopic member 1, 2, it being understood that more than one of these assemblies may be utilized in a single installation. For example, in motorcycle front wheel suspensions, it will be common to use two of them in a fork arrangement. For convenience in disclosure, telescopic member 1 is sometimes hereinafter called the "lower telescopic member," and telescopic member 2 is hereinafter called the "upper telescopic member."

The telescopic members have a common axis 50 of relative motion and are coaxial thereon. When they move apart from one another, i.e., when member 1 moves down and member 2 moves up in FIG. 1, the movement is called an axial extension, and when they move in the opposite direction, it is called an axial contraction.

In use, the lower telescopic member 1 will generally be connected to an axle or some other portion of the running gear of the vehicle, while the upper telescopic member will be connected to the frame. It is the function of this device to provide springing means to stabilize and support the relative motion of the said two parts (i.e., frame and axle). Telescopic member 2 includes an internal fluid-tight chamber 51. The fluid-tight chamber 51 includes a plunger recess 19, which is coaxial with axis 50 and opens toward the bottom in FIG. 1.

A plunger 4 is attached to lower telescopic member 1. It makes a fluid-tight, sliding sealing fit therewith and projects into chamber 51. The plunger and plunger recess are coaxial and parallel to the axis. Together they form a first decelerator 52 for deceleration of axial contraction of the springing means, at least near the limit thereof, as a consequence of the entry of the plunger into the plunger recess.

The free end 53 of plunger 4 is radiused, and immediately adjacent to that, the plunger is provided with a tapered axial cross-section throughout portion 54 of its length. Conveniently, the lower portion 55 is circularly cylindrical for sealing purposes.

A second decelerator 60 is provided for decelerating the extension movement of the springing means, at least near the limit thereof. The second decelerator includes a valving member 5 which is rigidly attached to the plunger inside the chamber 51. Valving member 5 includes a seal 6 in the form of a shoulder adapted to bear on a seat 7 carried by a valve seat member 8. Valve seat member 8 is attached to telescopic member 2.

For a major portion of its length near the bottom thereof, valving member 5 includes an axial tapered portion 61, tapering downwardly and inwardly toward the bottom of telescopic member 1 in FIG. 1. A cylindrical portion 62 adjacent to the tapered portion closely fits an inside cylindrical surface 63 on valve seat member 8. Valve seat member 8 forms a decelerator recess (bounded by the cylindrical surface 63, into which the valve seat member enters near the limit of the extension motion).

The valving member 8 includes a sleeve 9 within which the plunger axially moves. The decelerator recess lies above sleeve 9. Passages 65 are formed in the outer wall of valve seat member 8 at seat 7 so as to form a passage that extends from spacing 66 (between the valve seat member and the inside wall of telescopic member 2) and chamber 51. This makes possible the transfer of hydraulic liquid betwen these regions near the end of the extension movement, i.e., near the closed position shown in the FIGS. Radial passages 10 transfer the hydraulic liquid from the region surrounding the plunger to the spacing 66. There is a slight clearance 67 inside sleeve 9 to permit fluid to flow from the decelerator recess to passages 10. Some one of the clearance 67, passages 10, or passages 65 is sufficiently small as to exert a restriction on the expulsion of liquid from the decelerator recess near the end of the extension stroke.

A seal portion 68 is formed at the bottom of valve seat member 8 and carries a pair of O-ring grooves 69, 70 which hold O-rings 14 and 15 that seal respectively between the valve seat member and the telescopic member 2 and between the valve seat member and the cylindrical poriton of plunger 4.

The seal portion 68 bears against a step 71 in the inside wall of telescopic member 2. On the other side of the seal portion, a tube 12 bears against it to hold it against step 71. A snap-ring 13 is snapped into a ring groove 72 to retain it. This provides for the rigid attachment of the valve seat member to the telescopic member 2.

Plunger 4 is attached to telescopic member 1 at the bottom portion thereof. An auxiliary decelerator 75 is formed by surrounding the plunger at its bottom with a tapered valving member 16. The plunger and valving member 16 are held to the bottom of telescopic member 1 by a nut 17. Valving member 16 has a tapered shape in axial cross-section and is adapted to enter a decelerator recess 76 (FIG. 2) formed by tube 12 and closed at the top by the O-rings. The auxiliary decelerator acts in the same manner as the second decelerator, except that it expels gas instead of liquid when the springing means nears the limit of its contraction.

The plunger recess 9 is formed in an insert 18 fastened to the upper end of telescopic member 2. It projects axially inside the cylinder. Plunger recess 19 is preferably cylindrical and is only slightly oversized relative to the cylindrical portion 55 of the plunger so as to make close sliding fit. The tapered portion 54 of make a plunger has a considerably smaller radius.

A bypass passage 77 is formed in a shoulder 78 around the insert. This passage makes a bypass flow path across this shoulder to an annular spacing 21. The annular spacing 21 is located between the outside of the insert and the inside of the telescopic member 2. A conduit 3 connects to the top of telescopic member 2. Channel 22 departs from a recessed bottom 20 of recess 19 to communicate with annular spacing 21. Additional channels 24 intercommunicate annular spacing 21 with bore 23 in the insert. Therefore, channel 22, annular spacing 21, and channel 24 and bore 23 form continuations of the conduit 3 to chamber 51. The bypass passage forms a passage in parallel with that through channel 22 and recess 19.

A vent port 79 is formed in the wall of an enlargement in telescopic member 1 to relieve any undesired pneumatic build-up therein.

Attention is called to the fact that shoulder 78 includes a face 25 which can form a bearing surface to give end support to a spring (not shown). The spring would, when used, be placed in opposition between face 25 and seat 26 on seal 6 to provide additional extension force. This allows the combination of hydraulic springing shown to be combined with the action of a mechanical compression spring, if desired.

It is evident that hydraulic fluid under pressure in conduit 3 will tend to extend the springing means. It is equally evident that the performance of the springing means is greatly influenced by the rate with which the hydraulic liquid can be moved back and forth in conduit 3. In order to provide the necessary restrictions on the rate of flow, the various related passages may be suitably sized relative to one another. In addition, a proper pressure and, if desired, a pressure which varies with the amount of extension or contraction of the springing means, can be provided by a pneumatic-hydraulic accumulator 28.

Accumulator 28 includes a pneumatic section 27 adapted to be filled with a gas under pressure, such as through a filler valve 80. A hydraulic section 81 is located on the oppositie side of a movable wall 82 from the pneumatic section. The preferred embodiment of movable wall 82 is, of course, a flexible diaphragm which extends across the two sections and separates them one from the other. The wall moves to equalize the pressures between the two sections. The gas pressure tends to maintain the liquid under a pressure which is proportional to the volume of the pneumatic section. This in turn is a function of the amount of extension of the springing means. As it contracts, the system pressure rises.

An inwardly-projecting neck 30 enters the pneumatic section to provide a support against which the central portion of the diaphragm can bear under extreme conditions of hydraulic pressure.

Rate control valve means 85 interconnects the accumulator and conduit 3. The rate control valve means includes a body 38 which bounds a pair of flow chambers 31, 32 that are separated from one another by a rigid and immovable wall 33. Wall 33 is pierced by openings 34, 35, 36 and 37.

Conduit 3 is directly connected to chamber 32 and is connected to chamber 33 through a bypass valve 45 with an adjustable screw 46 which adjusts the potential rate of flow through channels 47. Therefore, bypass valve 45 is connected in parallel to chamber 32 and in series with chamber 31. The openings 34 and 35 and 36 and 37 intersect one another in pairs in the wall 33 as they pierce the wall.

Two valve discs 39, 39' are disposed around a central shaft 40, one on each side of the wall. Springs 41, 42 bear against body 38 and respective discs 39 39' to press them against the corresponding side of the wall 33. The forces of said springs can individually be adjusted by means of tubes 43, 44 threaded into body 38. As can best be seen from an examination of FIG. 3, the valve disc 39 is adapted to close ports 34 and 36, and valve disc 39' is shown adapted to close openings 35 and 37. The illustrated position is one which will not ordinarily be attained, and is for illustration only. Usually, only one or the other of these valves will be open, and often both of them will be closed. They are shown both open to illustrate their open position. The usual flow will be through the bypass valve, with both valve discs closing their respective ports, and, of course, some flow can pass through the unblocked intersecting portions of the openings. If, however, a sudden surge occurs, then, depending on the direction of the surge, one or the other of the valve discs will be displaced against its spring to open the respective openings and permit flow through the additional portions of the openings to accommodate the surge. Primary control of the flow rate is by the adjustment by the bypass valve 45, and control of the surge rates by adjustment of springs 41 and 42. If desired, only the bypass, or only the relief, valves may be used. The use of both together is advantageous.

Attention is again called to the fact that an additional device, including all of the elements surrounding telescopic members 1 and 2, may be attached to the left-hand end of conduit 3 in FIG. 1 and may utilize a common accumulator. This is the arrangement which will conventionally be used in the fork of a motorcycle, for example. Should only one of these devices be utilized, then one end of conduit 3 will be capped off adjacent to the rate control valve means. Attention is again called to the fact that, in addition to front fork springing for motorcycles, the springing means can also be used on cars, especially those which are designed to run at high speeds on rough ground. The device can operate in any orientation, from substantially vertical to horizontal to upside down.

As an alternative to passages 65, grooves or slots can be formed in the valve seat member 8 or in the valving member 5 to permit metered passage of fluid from the decelerator recess into chamber 51. It is further noted that conduit 3 is connected to chamber 51 in two ways in FIG. 1. One way is by connection to the plunger recess 19, and the other way is through bypass passage 77. These are in parallel flow connection. Either or both paths may be used. If the path through the plunger recess is not provided, then sufficient clearance must be provided between the cylindrical portion of the plunger and the wall of the plunger recess to permit restricted flow of liquid out of the recess when the cylindrical portion enters it, or notches or grooves for that purpose must be provided.

The term "telescopic" means that one member enters the other. The tube surrounding the plunger in telescopic member 1 is optional, but convenient.

The operation of the device should be evident from the foregoing. When the weight is off the springing means, such as, by example, when the vehicle tends to leave the ground, the pressure from the accumulator will cause the second telescopic member to move in an extension direction to attempt to maintain contact with the ground, and near the end of that stroke the movement will be damped by the action of the second decelerator. The action of the second decelerator will be determined in part by the shape of its various surfaces and the size of the various passageways associated when these passageways are used.

When the vehicle returns to ground it acts as a heavy load. The resulting force tends to contract the springing means, and this contractive force is resisted both by the fluid force from the accumulator, whose pressure increases with the amount of liquid pressed back through conduit 3, and also is damped by the fluid resistance of bypass passages 77. Othere fluid restrictions can be provided in the system in various shapes and sizes to give a sequential action as the plunger enters the plunger recess, if desired, for example by providing orifices (not shown) extending between plunger recess 19 and annular spacing 21, spaced apart along the plunger recess, and having sizes which are larger closer to the open end of plunger recess 19 than toward its bottom.

The rate of flow of the hydraulic fluid in conduit 3 is resisted not only by the gas pressure in the accumulator, but also by the resistance of rate control valve means 85. The more open this valve is, for example, the more open valve 45 is, and the easier it is to open valve discs 39 and 39', the more responsive will be the springing means.

Should a retraction overload occur, then valve disc 39 will be displaced after sufficient force is exerted on it so as to provide an auxiliary flow path.

For extension, gas pressure will exist to cause it, but again the rate will be limited by the rate control valve means, and in the event that the differential becomes too large, the valve disc 39' will be displaced and provide an additional flow path.

The auxiliary decelerator operates somewhat as a dashpot, the movement upward of telescopic member 1 being damped by the compression of air inside the decelerator recess and by its rate of leakage out of it if leakage is permitted.

This invention is not to be limited by the embodiments shown in the drawings and described in the description, which are given by way of example and not of limitation, but only in accordance with the scope of the appended claims.

I claim:

1. A telescopic springing means for a vehicle, comprising: a first and a second telescopic member, said members each having an axis of relative motion and being coaxial, and intended for attachment to respective relatively movable parts of a vehicle, so as to move coaxially relative to one another to one another when the said parts move relative to one another, one of said telescopic members forming an internal fluid-tight chamber including a plunger recess; a plunger attached to the other of said telescopic members projecting into the said chamber and making a sliding sealing fit therewith, said plunger and plunger recess being coaxial with each other and parallel to said axis and forming a first decelerator for deceleration of axial contraction of the springing means as a consequence of the entry of the plunger into the plunger recess; a pneumatic-hydraulic accumulator having a closed pneumatic section adapted to be filled with a gas under pressure, a hydraulic section filled with liquid, and a movable wall separating the sections so as to equalize their pressures; a conduit connecting the hydraulic section to the chamber; and a second decelerator for deceleration of axial extension of the springing means, said second decelerator comprising a valve seat member attached to said one of the telescopic members, and a valving member attached to the plunger inside the chamber, said valve seat member forming a seat and a decelerator recess opening into said chamber, and said valving member being adapted to enter said decelerator recess at least near the end limit of the extension motion, the entry of said valving member into said recess causing expulsion of liquid therefrom, the restriction of which decelerates the extension motion, and whereby pressure in said conduit tends to extend the springing means and resist its contraction, and the decelerators tend to decelerate their respective motions at least near the limit thereof.

2. Means according to claim 1 in which the plunger is tapered at least near its end which enters the plunger recess.

3. Means according to claim 1 in which rate control valve means is connected in said conduit between said chamber and the hydraulic section.

4. Means according to claim 3 in which said rate control valve means comprises an adjustable restrictor valve.

5. Means according to claim 4 in which said rate control valve means further comprises a bi-directional relief valve in parallel flow connection with said adjustable restrictor valve for opening an additional flow path when the pressure differential across the relief valve exceeds a predetermined value.

6. Means according to claim 5 in which the bi-directional restrictor valve includes a pair of spring-loaded valving members whose spring loads are individually adjustable.

7. Means according to claim 1 in which the conduit is fluidly interconnected to the plunger recess adjacent to its end farther removed from the plunger.

8. Means according to claim 1 in which a restrictive bypass channel is formed between the conduit and the chamber, in parallel connection with the plunger recess.

9. Means according to claim 8 in which the conduit is fluidly interconnected to the plunger recess adjacent to its end farther removed from the plunger.

10. Means according to claim 1 in which an insert is mounted in the said one telescopic member, having the plunger recess in one end and a supply recess in the other end, and flow channel means interconnecting them.

11. Means according to claim 10 in which the last-named flow channel includes an annular spacing between the said one telescopic member and the insert.

12. Means according to claim 11 in which a restrictive bypass channel is formed between the conduit and the chamber, in parallel connection with the plunger recess, said bypass channel entering said annular spacing.

13. Means according to claim 1 in which a pneumatic auxiliary decelerator is formed between the two telescopic members, said pneumatic auxiliary decelerator comprising a cup-shaped decelerator recess in one of said telescopic member, and a tapered valving member attached to the other, said tapered valving member entering the receiver and restricting the expulsion of air therefrom to damp the contraction of the springing means near its limit of contraction.

14. Means according to claim 3 in which the conduit is fluidly interconnected to the plunger recess adjacent to its end farther removed from the plunger.

15. Means according to claim 14 in which said rate control valve means comprises an adjustable restrictor valve.

16. Means according to claim 15 in which said rate control valve means further comprises a bi-directional relief valve in parallel flow connection with said adjustable restrictor valve for opening an additional flow path when the pressure differential across the relief valve exceeds a predetermined value.

17. Means according to claim 1 in which passage means is provided in one of said valve seat members, and said valving seat member forming said second decelerator to provide a flow path for expulsion of liquid therefrom.

18. Means according to claim 17 in which rate control valve means is connected in said conduit between said chamber and the hydraulic section.

19. In combination: a pair of springing means according to claim 1, with but a single accumulator, said accumulator being connected to both of the chambers.

* * * * *